March 9, 1954 — M. L. RHINE — 2,671,411
ROTARY PUMP OR MOTOR
Filed May 2, 1949 — 2 Sheets-Sheet 1
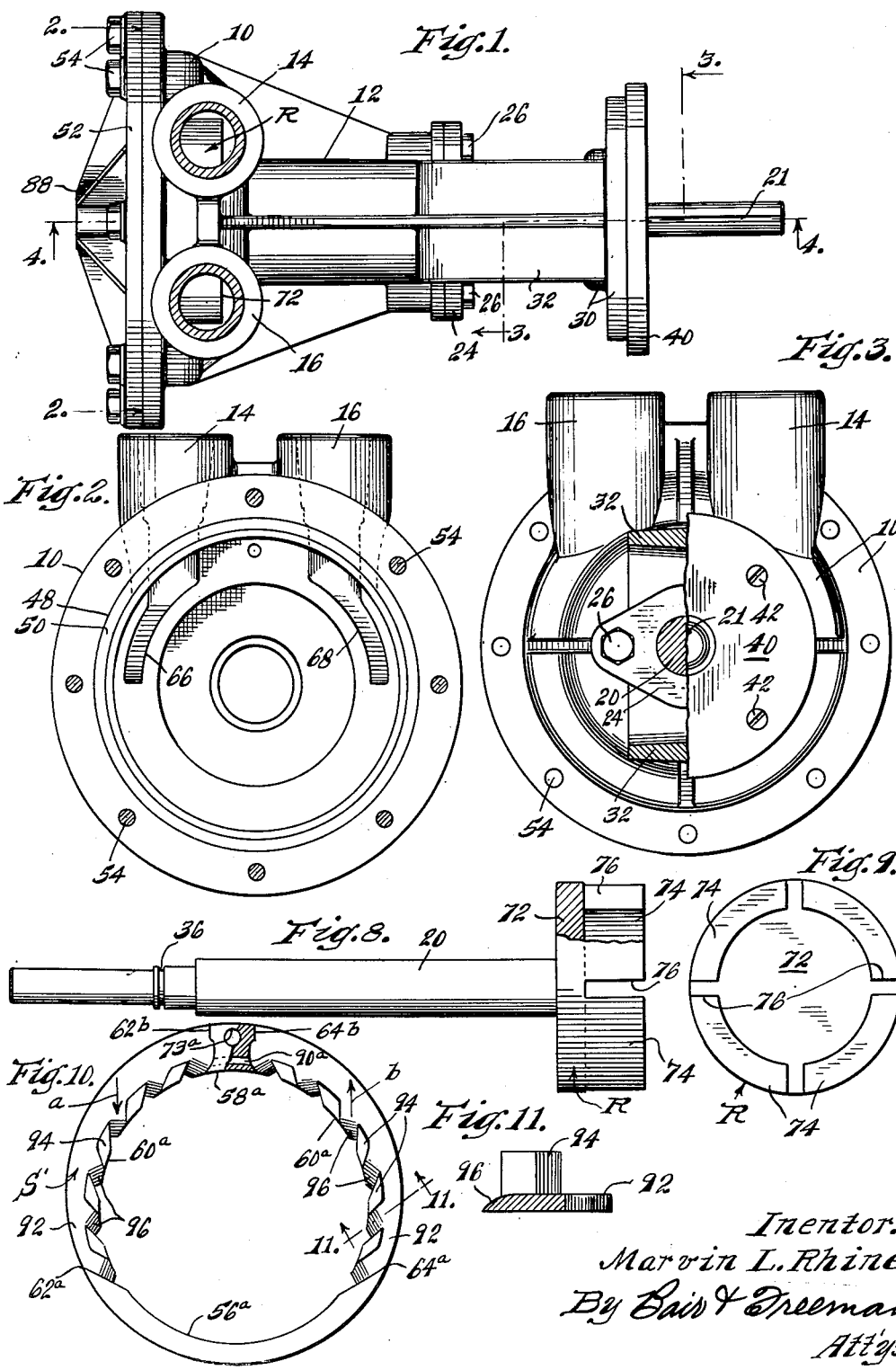
Inventor.
Marvin L. Rhine.
By Bair & Freeman
Att'ys.

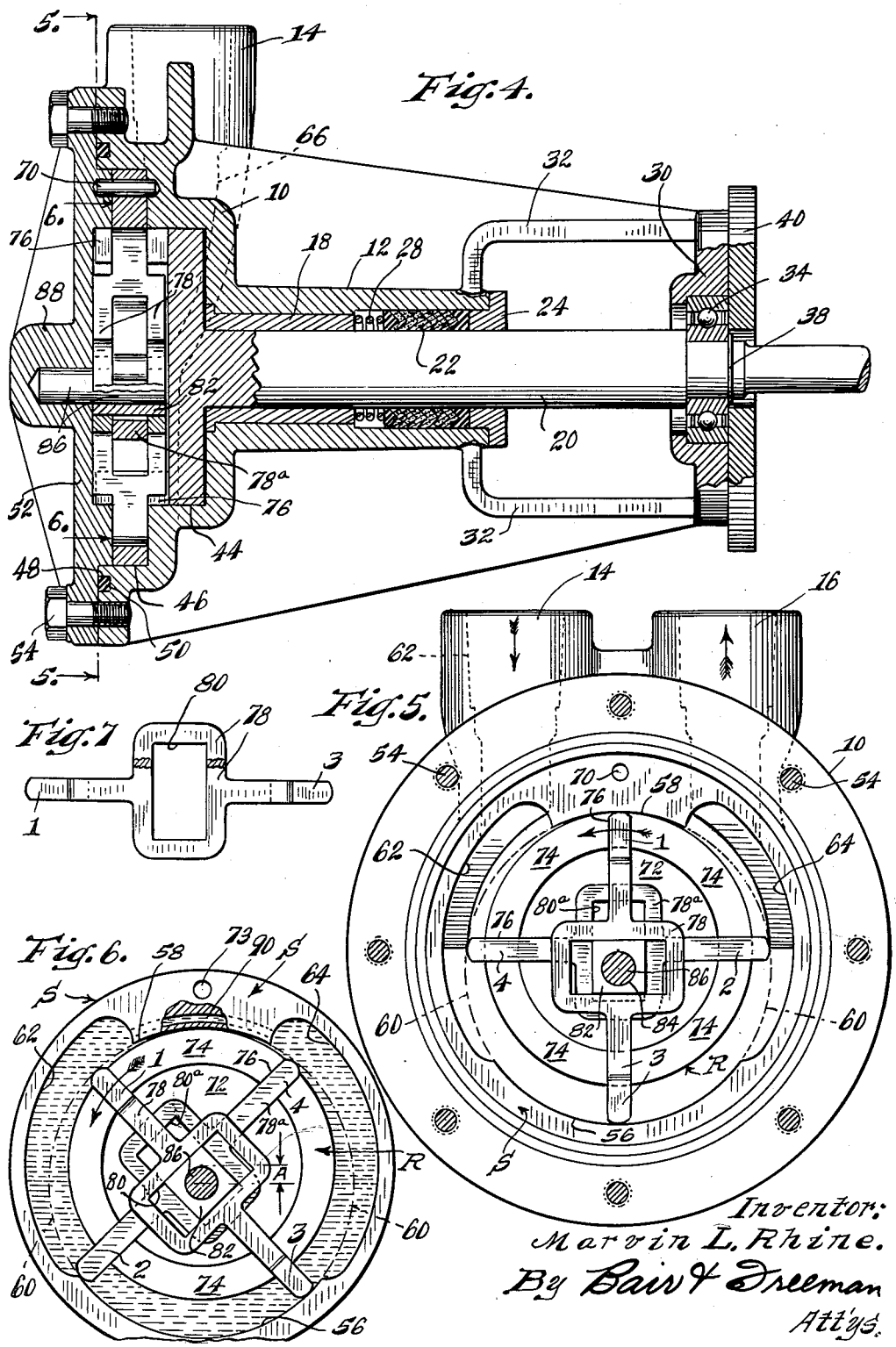

Patented Mar. 9, 1954

2,671,411

UNITED STATES PATENT OFFICE 2,671,411

ROTARY PUMP OR MOTOR

Marvin L. Rhine, Chicago, Ill.

Application May 2, 1949, Serial No. 90,900

2 Claims. (Cl. 103—144)

1

This invention relates to a rotary pump or motor in which the stator has a cavity for the rotor, the outline of the cavity being an out-of-round circle in which inlet and outlet ports are cut.

One object of the invention is to provide a stator cavity wherein all opposite points across a center that is eccentric to the center of rotation of a rotor in the cavity are the same distance apart so that rotor blades alined with said eccentric center, extending between opposite surfaces of the stator cavity and provided with lateral slots, may be positively and accurately shifted inwardly and outwardly by means of an element rotating around said eccentric center and relative to which said lateral slots slide.

Another object of the invention is to provide positive drive means for the blades in their sliding motion relative to the rotor so that slight clearance can be had between the ends of the blades and the stator cavity when liquids are being pumped or when a fluid under pressure is used to run the motor, thus eliminating wear on the blade ends and in the stator as when individual blades are held out by springs and/or centrifugal force and rub against the stator.

Still another object is the provision of a relatively inexpensive pump or motor formed of a minimum of parts and those parts readily assembled in a minimum of time, the arrangement being such that the parts can be readily disassembled for replacement or other service requirements.

A further object is to provide a pump or motor having a housing, the interior of which is bored out to a true circle in one part wherein a rotor rotates and counter-bored to a larger diameter to receive a stator insert of circular outside diameter and out-of-round shape on its inside surface wherein blades slidably carried by the rotor may travel, the blades extending from side to side of the out-of-round-shaped stator cavity.

A still further object is to provide a novel blade driving arrangement cooperating with the blades for positively sliding them so their outer ends follow an out-of-round path instead of depending on centrifugal force, springs or the like to hold the blades against the stator surface.

A further object is to provide the housing with a cover plate, which, when removed, permits ready access to the rotor, the stator insert and the blades being then readily removable for replacement or other servicing and the parts being capable of ready reassembly in a minimum of time.

2

An additional object is to provide a removable stator insert having an exterior surface that is a true circle to fit in the counter-bore of the housing and which has an internal surface that is out-of-round, the insert being properly indexed in the housing and removable for replacement purposes so that a pump or motor of the character disclosed when operating improperly from excessive wear can be serviced and placed back in service in a short period of time by removal of the blades and/or stator insert, and if necessary the rotor also or parts can be substituted for changing the capacity and/or operating characteristics of the pump or motor.

Another additional object is to provide a rotary pump which does not lose its prime, a priming by-pass from the outlet port to the inlet port of the stator insert being provided for this purpose.

With these and other objects in view my invention consists in the construction, arrangement and combination of the various parts of my device whereby the objects contemplated are attained as hereinafter more fully set forth, pointed out in my claims and illustrated in the accompanying drawings wherein:

Figure 1 is a plan view of a rotary pump or motor embodying my present invention;

Figure 2 is an end view thereof with the cover plate for the housing removed as taken at the parting line indicated by the arrows 2—2 of Figure 1, the stator insert, the rotor and the rotor blades being omitted;

Figure 3 is a vertical sectional view on the line 3—3 of Figure 1;

Figure 4 is an enlarged vertical sectional view on the line 4—4 of Figure 1;

Figure 5 is a sectional view as taken on the parting line of the cover plate as indicated by the arrows 5—5 of Figure 4, the stator insert, the rotor and the rotor blades being in position;

Figure 6 is a view of a portion of Figure 5 on a reduced scale showing only the stator insert, the rotor and the rotor blades in the position they assume when turned 45 degrees from the position of Figure 5, the pump or motor in this figure being shown filled with liquid;

Figure 7 is an elevation of one of the rotor blades per se;

Figure 8 is an elevation of the rotor and its shaft per se;

Figure 9 is an end view of the rotor in Figure 8;

Figure 10 is an elevation of a stator insert per se, the figure illustrating a modification; and Figure 11 is an enlarged sectional view thereof on the line 11—11 of Figure 10.

On the accompanying drawings, I have used the reference numeral 10 to indicate a pump or motor housing which is preferably formed with a hub 12 and inlet and outlet bosses 14 and 16. The hub 12 is adapted to receive a bearing sleeve 18 for a rotor shaft 20 which is sealed in relation to the hub 12 by packing 22 and a packing gland 24. Cap screws 26 are provided for retaining the packing gland in position and a compression spring 28 backs up the gland.

A bearing plate 30 is formed as part of the housing 10 and its hub 12, the plate being connected with the hub by means of a pair of arms 32. The parts 10, 12, 30 and 32 may be cast all in one piece. The bearing plate 30 receives a ball-bearing assembly 34 for the shaft handle, the shaft being grooved as indicated at 36 in Figure 8 and provided with a retainer ring 38 shown in Figure 4 for the inner race of the bearing assembly 34 with respect to the shaft 20. The outer race is retained in position by a mounting plate 40 suitably secured to the bearing plate 30 as by screws 42 (see Figure 3).

The housing 10 has a circular bore 44 therein concentric with the axis of the shaft 20 and a counter-bore 46 also concentric therewith. The counter-bore 46 is surrounded by a groove 48 receiving a packing ring 50. A cover plate 52 is provided for the housing 10 and is secured in position against the packing ring 48 by cap screws 54.

Within the counter-bore 46 a stator insert S is provided, the shape of which is shown in Figures 5 and 6. The outer surface of the stator insert is a circle and its inner surface is formed out-of-round and eccentric to the outer surface. The lower fourth of the inner surface is indicated at 56 and the upper eighth of which is indicated at 58 although the extent of these surfaces may vary. A pair of broken lines 60 in Figure 5 together with the surfaces 56 and 58 denote the complete shape of the inner surface. Coincident with these broken lines the inner surface of the stator insert S is cut out as at 62 and 64 to form inlet and outlet ports in the insert. The surfaces 56 and 58 form barriers between the inlet and outlet ports in an obvious manner.

The ports 62 and 64 communicate with inlet and outlet ports 66 and 68 in the housing 10 which last ports in turn communicate with the inlet and outlet bosses 14 and 16. The stator insert S is indexed in relation to the housing 10 by an index pin 70.

A rotor R is formed as part of the shaft 20 or as a separate part connected with it and comprises a disk-like portion 72 and a cylindrical flange 74. Slots 76 are provided in the flange 74 and these may be four in number for a four-bladed pump or motor as disclosed, or two in number where only two blades are used. The shaft 20 is provided on its end opposite the rotor R with a key-way 21 so that in the case of a pump a gear or other driving element may be connected with the shaft, whereas in the case of a motor a driven element may be connected therewith. The shaft 20 and thereby the rotor R rotate on the axis of the outer surface of the stator, and since the inner surface of the stator is eccentric to the outer surface, the rotor is eccentrically mounted with respect to the inner surface of the stator.

Referring now to the blades used in connection with my pump or motor, Figure 7 illustrates one of them in which I have used the reference numerals 1 and 3 to indicate the blade elements that slide through two of the opposite slots 76. Actually the blades 1 and 3 are a single blade element inasmuch as they are formed all in one piece. A central yoke 78 defines a slot 80 laterally of the blade element 1—3. The yoke 78 is of bifurcated construction as illustrated in Figure 4 and the other blade element designated 2—4 in Figure 5 is similar to the blade element 1—3 except that it has a single yoke 78a to fit between the bifurcated yoke 78. The yoke 78a defines a slot 80a which is lateral to the blade element 2—4.

The slots 80 and 80a constitute cross-heads which receive a square block or cross-head bearing 82 having a hole 84 through its center. This hole is adapted to rotate on a pin 86 mounted in a boss 88 of the cover plate 52 and the pin is off-center from the axis of the shaft 20 as represented by the dimension A in Figure 6. The axis of the pin is in fact coincident with the axis of the out-of-round surface 56—58—60. When the blades 1—3 and 2—4 are mounted on the block 82 in this manner (or on a pin 86 having a diameter equal to the width of the slots 80 and 80a and there is no block) the outer ends of the blades describe a conchoid when the rotor is rotated, such out-of-round circle being indicated in Figure 5 by the surfaces 56 and 58 and the broken lines 60. The surfaces 56 and 58 may be initially cut in a milling machine by means of a cutter that is similarly mounted to describe this out-of-round path. Sealing is had between the surface 58 and the rotor R by reason of the rotor rotating against the surface 58 as shown in the upper part of Figure 5. The arrangement disclosed provides in a pump or motor a positive means for causing the outer ends of the blades to follow the out-of-round path without the necessity of having to be guided by the inner surface of the stator. The rotor R is in sealing contact against the central portion of the surface 58 and spaced from the inner surface of the stator at other points so as to provide a pumping chamber. When pumping liquids, slight clearance can be provided between the ends of the blades and the surfaces 56 and 58 to eliminate wear at these points without prohibitive leakage across the ends of the blades. When the liquid being pumped is particularly viscous, this clearance can be increased if desired and decreased to but a few ten-thousandths of an inch for thinner fluids or for air or gas.

Individual blades which are forced out by spring pressure or by centrifugal force as in many prior rotary types of pumps and motors present a problem of wear at the outer ends of the blades and on the inner surface of the stator which problem is entirely eliminated with my type of construction. This also makes possible the cutting out of the ports 62 and 64 all of the way across the width of the stator insert as a complete 360 degrees of contact surface for the end of the blade is unnecessary. The pump or motor in operation is then charged with fluid being pumped or with the actuating fluid as illustrated in Figure 6 wherein there are shown three bodies of fluid, the lefthand body coming into the pump or motor, the lower body trapped between blades 2 and 3 and the righthand body communicating with the outlet. As the pump rotates counterclockwise the lower body of fluid is displaced because the limits defining the cavity for it are decreased as indicated by the righthand surface of the rotor and the righthand out-of-round line 60, whereas on the opposite side the cavity is being increased for intake of fluid. Similarly in a motor the incoming fluid at the left tends to expand the cavity defined between the lefthand side of the rotor and the lefthand out-of-round line 60 thus tending to rotate the rotor counter-clockwise whereupon the decreased cavity at the righthand side of the figure displaces the used fluid through the outlet.

A pump of the character disclosed does not lose its prime if a priming by-pass 90 is provided between the outlet port 64 and the inlet port 62 as shown in Figure 6. This by-pass need not be very large in diameter in order to permit the small quantity of liquid that remains in the pump after the supply of liquid to it has been depleted to pass through the by-pass into the intake side of the pump when the pump is started up again. I have found that even a tablespoonful of water left in the pump will prevent the pump from losing its prime except of course if the pump is left standing so long the water evaporates.

To increase the efficiency of the pump I find that the stator insert S may be modified somewhat as shown in Figures 10 and 11, the insert in these figures being designated S'. It has a conchoid shaped inner surface with the portions 56a and 58a similar, but of different extent than illustrated in Figure 5 and the portions 60a somewhat more complete than in the previous figures by reason of a washer-like flange 92 extending from the outer circular diameter to the inner out-of-round surface instead of being completely cut away as at 62 and 64 in Figure 6. A series of stationary vanes 94 are formed on the flange 92, the flange being provided to support them. At the entering or exit edge of each vane the flange 92 is rounded off as indicated at 96 or "streamlined" to reduce turbulence. The vanes 94, it will be noted, are inclined to the axis of rotation of the rotor so as to deflect the liquid axially into and out of the stator. The vanes also deflect the liquid in a tangential direction as indicated by the arrows a and b and this arrangement serves to increase the efficiency of the pump or motor due to the directing characteristics of the vanes 94.

The arrows a and b are in the general direction of the inlet and outlet ports 66 and 68 of the housing 10 which would be modified to some extent to come in over the periphery of the flange 92 instead of from the back as in Figure 2. The lower extent of the inlet port of the stator insert shown in Figure 10 is indicated at 62a and its upper extent at 62b, whereas similar extents of the outlet port are indicated at 64a and 64b.

My pump or motor is so constructed and the parts are so arranged and related to each other that the blades and/or the stator insert may be readily replaced if wear occurs. By the removal of eight cap screws 54, the cover plate 52 may be removed, the stator and blades lifted out of the housing 10 and the rotor R and replaced by others. If the rotor is worn it can also be readily replaced at this time.

If it is desirable to change the capacity of the pump a different stator insert, for instance one having less capacity, can be substituted and a new cover plate 52 with less off-set for the pin 86 provided. As to the blades per se, they may be metal, plastic or rubber depending on the material being pumped or used to operate the device as a motor.

I claim:
1. A rotary device comprising a housing having a bore and a counter-bore, a washer-like stator insert in said counter-bore, said stator insert having an out-of-round shaped inner surface interrupted by inlet and outlet ports, said housing having inlet and outlet ports communicating with said inlet and outlet ports of said stator insert and located at one side of said insert, a rotor rotatable in said bore eccentrically relative thereto to provide a pumping chamber, said rotor being provided with diametrically opposite slots, a blade slidable in said slots and having an open sided cross head slot, a cross head bearing in said slot having elongated sides against which the sides of the slot slide, means located at the out-of-round axis for rotatably supporting said cross head bearing, and a cover plate for said housing and supporting said means.

2. In a rotary pump or motor, a housing having a counter-bore, a stator insert therein provided with inlet and outlet ports, said stator insert comprising a washer-like ring adapted to fit in said counter-bore and having an out-of-round shaped inner surface, the axis of the out-of-round surface being off-set in relation to the axis of the outer circumference of the washer, barriers at the narrowest and the widest portions of said stator insert for defining between them inlet and outlet ports for the stator, said stator having adjacent its inner surface a series of stationary director vanes tangentially directing the liquid into and out of the stator cavity, the surfaces of said vanes against which the fluid impinges being inclined to the axis of rotation of said rotor to deflect the fluid axially into and out of said stator cavity, a rotor rotatable eccentrically within said out-of-round surface to provide a pumping chamber, a pair of through blades slidable in said rotor and adapted to substantially contact the diametrically opposite surfaces of said stator insert, and means to positively drive said blades slidably with respect to said rotor so their outer ends describe an out-of-round path comprising an open sided slot laterally of each through blade, a block relative to which said slots are slidable, said block being rotatable about the out-of-round axis.

MARVIN L. RHINE.

References Cited in the file of this patent

UNITED STATES PATENTS

| Number | Name | Date |
|---|---|---|
| 263,510 | Gurd | Aug. 29, 1882 |
| 601,158 | Murphy | Mar. 22, 1898 |
| 825,671 | Machlet | July 10, 1906 |
| 1,270,872 | Roberts | July 2, 1918 |
| 1,857,931 | Axien | May 10, 1932 |
| 1,940,384 | Zoller | Dec. 19, 1933 |
| 1,969,881 | Gardner | Aug. 14, 1934 |
| 2,231,650 | Adams | Feb. 11, 1941 |
| 2,264,953 | Regar | Dec. 2, 1941 |

FOREIGN PATENTS

| Number | Country | Date |
|---|---|---|
| 16,205 | France (Addition to #443,910.) | Sept. 28, 1912 |
| 28,681 | France (Addition to #567,313.) | Dec. 15, 1924 |
| 228,264 | Great Britain | Feb. 2, 1925 |
| 392,999 | Great Britain | June 1, 1933 |
| 401,528 | Great Britain | Nov. 16, 1933 |